United States Patent [19]

Takahashi et al.

[11] Patent Number: 4,985,184

[45] Date of Patent: Jan. 15, 1991

[54] PRODUCTION OF CARBONACEOUS POWDERS AND THEIR GRANULATION

[75] Inventors: Kunimasa Takahashi; Takashi Kameda; Masato Yoshikawa; Teruo Teranishi, all of Yokkaichi, Japan

[73] Assignee: Mitsubishi Petrochemical Company Limited, Tokyo, Japan

[21] Appl. No.: 246,272

[22] Filed: Sep. 19, 1988

[30] Foreign Application Priority Data

Sep. 18, 1987 [JP] Japan ............................ 62-234647
Oct. 14, 1987 [JP] Japan ............................ 62-259188

[51] Int. Cl.$^5$ ........................ B29B 9/00; C01B 31/02
[52] U.S. Cl. ..................................... 264/6; 208/39; 208/45; 264/29.4; 264/29.6; 264/85; 264/115; 264/122; 264/123; 264/126; 264/12; 264/13; 264/28; 423/447.4; 423/447.7; 427/221; 427/226
[58] Field of Search ............... 427/220, 221, 228, 227, 427/226; 208/39, 44, 45; 423/447.4, 447.6, 447.9, 448, 449, 447.7; 264/5, 7, 115, 117, 118, 6, 122, 123, 125, 126, 134, 137, DIG. 20, DIG. 19, 29.1, 29.3, 29.5, 105, 29.4, 12, 29.6, 85, 13, 26

[56] References Cited

U.S. PATENT DOCUMENTS

| | | | |
|---|---|---|---|
| 4,188,279 | 2/1980 | Yan | 264/29.5 |
| 4,273,675 | 7/1981 | Shiiki et al. | 264/29.1 |
| 4,522,801 | 6/1985 | Yoshinori et al. | 423/447.4 |
| 4,594,287 | 6/1986 | Hucke | 264/29.5 |
| 4,704,333 | 11/1987 | Elkins et al. | 423/447.4 |
| 4,705,618 | 11/1987 | Tsuchitani et al. | 423/447.4 |
| 4,788,050 | 11/1988 | Hirose et al. | 423/447.6 |
| 4,847,021 | 7/1989 | Montgomery et al. | 264/29.3 |
| 4,849,021 | 7/1989 | Nakai et al. | 264/29.3 |

FOREIGN PATENT DOCUMENTS

| | | | |
|---|---|---|---|
| 253567 | 4/1962 | Australia | 427/220 |
| 218565 | 2/1985 | Fed. Rep. of Germany | 264/117 |
| 61-205609 | 9/1986 | Japan | 264/117 |
| 61-251504 | 11/1986 | Japan . | |
| 62-113509 | 5/1987 | Japan . | |
| 62-123007 | 6/1987 | Japan . | |
| 62-270686 | 11/1987 | Japan | 423/447.4 |

*Primary Examiner*—Jeffery Thrulow
*Assistant Examiner*—Mathieu Vargot
*Attorney, Agent, or Firm*—Oblon, Spivak, McClelland, Maier & Neustadt

[57] ABSTRACT

Manufacture of granulated self-sintering carbonaceous pulverulent body suitable for precise complicated molding in high speed productivity is conducted in the presence of a wetting agent and a binding agent in the water-pulverulent mixture by using spray drying machine in the atmosphere of the hot air kept at a temperature up to 200° C. optionally in admixture with superheated steam kept at a temperature up to 200° C.

5 Claims, 1 Drawing Sheet

PRODUCTION OF CARBONACEOUS POWDERS AND THEIR GRANULATION

BACKGROUND OF THE INVENTION

Field of the Art

The present invention relates to a process for granulating carbonaceous powders. Particularly, it relates to a process for granulating by spray-drying a carbonaceous pulverulent body which contains a self-sintering carbonaceous powder and, if desired, at least one member selected from the group consisting of graphite-rich carbons, carbon-rich carbons, metals and inorganic compounds, and which is dispersed in water in the presence of a binding agent and a wetting agent into a heated air which can, if desired, contain superheated steam.

More particularly, the present invention relates to a process for granulation in which a carbonaceous pulverulent body comprising (1) a self-sintering carbonaceous powder which is a powder of a pitch selected from the group consisting of coal-tar pitches, petroleum pitches, degraded naphtha tar pitches, mesophase-containing or heat-treated pitches and other modified pitches and/or a complex powder selected from powders of the group consisting of graphite-rich carbons, carbon-rich carbons, metals and inorganic compounds the surfaces of which have been substantially covered with the pitch referred to just above and (2), if desired, at least one powder selected from powders of the group consisting of graphite-rich carbons, carbon-rich carbons, metals and inorganic compounds is dispersed in water in the presence of a binding agent and a wetting agent and the slurry is then subjected to granulation by spray-drying it in a heated air which can contain superheated steam. The granular products according to the present invention are advantageous in that, when the granular product is pressed in a mold into a molded product of a complicated shape and the molded product is further carbonized and/or graphitized to obtain a carbonaceous product of a precision form, the granular products of the present invention are capable of being filled into such a variety of molds as having a narrow or complicated mold cavity, without unevenness in the filling compactness thanks to the fact that the initially formed compacted product is easily disintegrated into a final form.

The granular pulverulent body of the present invention not only brings about the change in the process in that a large quantity continuous molding will be made possible in the field of small size precision molding by means of a mold with use of a pressing machine but also produces compacted products of an increased denseness thanks to an improved flow characteristic in the production of various forms by means of hydrostatic pressing (CIP), high temperature isotropic pressing (HIP) or the like, endowed with another advantage that a granulation adjuvant, i.e. a binding agent and a wetting agent, will not impair the strength of a sintered product.

The pulverulent body of the present invention is a material suitable for a process for producing small size carbonaceous molded products having a dimension accuracy not by the conventional cut processing of a carbon-rich and/or graphite-rich block form but by cold press molding in a mold and then carbonizing and/or graphitizing the form.

Background Art: Granulating Process

The production of a form, i.e. a product having a desired dimensional form, by means of the conventional cut-processing and problems thereof are described in the following.

Among carbon precision forms, large size articles such as a graphite heater or a graphite crucible are manufactured by hollowing out a large size block, while the unused part can be advantageously utilized as a material for a smaller article. Moreover, the article itself occupies a most important part of a semiconductor crystal growing device and thus prefers the functions of the article rather than the article price, so that it is considered as a material which cannot be replaced by some others. On the other hand, in the field of a sliding member of an industrial rotary device (e.g. an oil free compressor cylinder part) or a nuclear reactor material of which damage will directly lead to a serious loss on safety and economy, a high density graphite block is used as a main material on the basis of reliance established by experiences over a long period.

It is well known that carbon-rich and graphite-rich carbon materials are the materials which are endowed with properties such as heat resistance, thermal conductivity, electric conductivity, chemical resistance, slidability, strength or the like in a good balance. However, these materials, contrary to plastic articles, have not been used yet in large amounts in a variety of shapes or forms in many industrial fields. One of the reasons is a reason in the supplier of carbon articles that the forms have essentially high prices.

Thus, in the case of a carbon-rich carbon block, it is prepared through a tedious process starting from the pulverization of a coke stock followed by its kneading with pitch, pulverization, hydrostatic pressing, carbonization (re-impregnation, carbonization), graphitization (and demetallization), so that it has inevitably a high price such as 2,000 to 5,000 yen/kg even in a large amount production process. In the above-described process, processes within parentheses refer to processes for high grade articles.

Furthermore, when a thin hollow box having a bottom plate and a cross partition as shown in FIG. 1 is intended to be cut out from a carbon block, half or more of the expensive material will be cut out as powdery scraps and lose its value and processing restrictions such as automatic production in a large amount of automatic production by means of an automatic lathe is impossible because of the necessity of a high level processing technology such as counter boring and a variety of special tools, so that the price of the box unavoidably reaches a level of at least several hundred yen. Accordingly, the carbon-rich block has scarcely been a target of evaluation in the field in which restrictions for not only function but also price of articles are required for the materials as a material to be spent in a large amount.

For the anode of a manganese dry cell a carbon rod is used, which is generally provided for use by mixing uniformly an earth-like graphite or scale-like graphite, cokes and the like with a tar and/or a pitch, heat-extruding the mixture into a shape, then carbonizing the shape at 900° to 1,000° C., and impregnating the pores of the calcined shape with paraffin or the like to make the shape water-impermeable. Although this method is excellent in its large amount producibility, it is pointed out that there are some problems such as, for example, a complicated process control, the necessity of a process for making the products water-impermeable. Moreover, in order to comply with a high load output required for a dry cell, improvements have recently been aimed at such as those of the cell components, the enlargement of the contact area of the carbon electrode with the cell components or the reduction of electric resistance. In Unexamined Published Japanese patent application No. 24210/1977, there is proposed a process for forming a carbon rod for a dry cell characterized in that a scaly graphite is mixed with a phenol or an epoxy resin as binding agents, preformed to ensure that the base surface of the graphite will be oriented to a longitudinal direction, then compressed under pressure along the length direction to be remolded, and the binding agent is solidified and fused by heating. However, it is considered according to this method that although the blocking of the pores is possible, problems such as degradation of the resin portion by the contact with cell components over a long period of years, lowering of the production efficiency due to the complicated molding techniques or the like.

In fact, however, hundred millions of carbon rods produced by conventional techniques are spent even at the present time.

In other words, it can be understood that inexpensive articles which are produced in a large amount and have a complicated shape have not been manufactured yet by the conventional block processing or the method in which carbonization is eliminated.

Trials for solving the problems have recently been disclosed.

As the technique for producing forms such as a spring, a bolt or a nut, reference can be made to Unexamined Published Japanese patent application No. 112609/1985. In this Publication, there is disclosed a method in which to a carbon fine powder comprising a carbonized or graphitized mesophase as an essential component is added a monomer, prepolymer or oligomer of a thermosetting resin as a binder, the two are dispersed into and mixed with each other and formed into a shape, then the binder is cured by polymerization, calcined in an inert atmosphere to produce a hard carbon form. The form obtained by the method described in the Publication has a smooth surface and is excellent in both strength and hardness. However, the production process disclosed has a necessity of passing twice through carbonization processes in the series of steps of the thermal treatment of a mesophase pitch→separation of the mesophase pitch from the non-crystalline matrix→calcination at 1,000° to 2,700° C.→complexing with a resin (dispersion, mixing, thermal condensation on a heated roll)→pelletization→shaping→infusibilization→carbonization.

As a process for producing a carbon form by means of a pressing machine, reference is made to Unexamined Published Japanese patent application No. 113509/1987. According to the Publication, particulate or powdery materials such as graphite, carbon black, coke and the like which have been blended together in appropriate amounts are bonded with a pitch tar, the product produced is then converted into a shape of super micro powder (5 μm), the powder is granulated with a phenol or a polyvinyl alcohol, and the granules are subjected to cold continuous molding in a punch type press by means of a mechanical cam-driven compression movement. Hitherto, it has been considered difficult to form a carbon for mechanical use. However, the filling of a pulverulent body in a forming machine has become possible by the control of a content of a; volatile component (7-12%) at the granulation of the pulverulent body and the core changing mechanism of the cam movement, the forming of the pulverulent body into an article size has become possible under a cold condition at a surface pressure from 1.5 t/cm$^2$ to 5 t/cm$^2$ at an instantaneous cam compression for 2 to 3 seconds.

SUMMARY OF THE INVENTION

Problems to be Solved by the Invention and Means for Solving the Problems: Granulation Method There is practiced in a large scale for example in a ferrite-relating industry production of a product having a complicated shape by obtaining a powdery form with a cold pressing machine and calcining the form. Monolithic molded products such as an iron-core of a transformer or a TV tuner are produced by a machine appropriate for a continuous molding such as a rotary pressing machine. It is also well known that the filling ability of a pulverulent body into a molding cavity is a predominant factor and the granulation of the pulverulent body is an essential item for maintaining the fluidity of the pulverulent body in order to make a form in a good size precision by this method.

Accordingly, it can easily be appreciated by a person skillful in the art that the granulation of a carbonaceous pulverulent body is required for providing the pulverulent body for powder molding However, it has been found that when the present inventors tried to obtain a granulating pulverulent body for a carbonaceous material, particularly a carbonaceous pulverulent body which is intended to be provided for molding, the following problems would be caused The present inventors have earnestly conducted researches in these problems and, as a result thereof, have found a novel method for solving the problems which has not hitherto been thought of.

(1) Drying Method and Wetting Agent

In order to obtain a granulating pulverulent body it is necessary to make a pulverulent body as a starting material into a slurry and to subject it to spray drying Carbonaceous materials containing pitches such as a pitch tar binding element or the like which have been disclosed in Unexamined Published Japanese patent application No. 113509/1987 as well as a self-sintering carbonaceous pulverulent body which is an essential component of a carbonaceous pulverulent body used in the present invention is lipophilic as far as chemical treatments such as surface oxidation or the like are not preformed. Accordingly, a method for granulating a pulverulent body by making a slurry together with a binding agent in an organic solvent and spray drying the slurry in an inert gas stream is generally used for granulation. However, it has been found that this method brings about the increase of the granulating cost because of complicated granulation processes such as the recovery of an organic solvent, the recycle of the organic solvent and huge amount of inert gas such as nitrogen and the like, and the increase of the cost becomes a factor which will remarkably inhibit in the face of the pulverulent body the production of an inexpensive form as an object of the present invention.

We have earnestly conducted research in the methods for reducing sharply the granulating cost by the practice of the spray dry granulation of the water slurry in hot air which can contain superheated steam on the basis of the fact that a self-sintering carbon pulverulent body as a main component of the carbonaceous pulverulent body will not be crosslinked (oxidized) substantially in hot air under 200° C. As a result thereof, we have found that non-ionic surfactants such as an alkylphenol ethylene oxide adduct or ethylene oxidepropylene oxide adduct, an oxyethylene-oxypropylene block polymer (mean molecular weight: 2,000-8,000), an alcohol ethoxylate, a polyhydric alcohol ester, a polyethylene glycol ester or the like are effective as a wetting agent which will disperse a lipophilic carbonaceous powder into water stably and in a high concentration and the addition of which will not lead to the decrease of the strength of a carbon form or the increase of impurities. Cationic surfactants were not suitable since they increase impurities such as Na or the like which are not desired to incorporate into a carbon form.

(2) Binding Agent

Most of the self-sintering carbonaceous pulverulent bodies, particularly pulverulent bodies which have been preliminarily subjected to a heat treatment will not exhibit caking at around room temperature, and thus it is necessary for maintaining the caked state of a granulated pulverulent body to add a binding agent to a slurry and to subject the mixture to spray drying. It was found that binding agents had different properties from each other and the compounds proposed by the prior art did not coincide with the object of the present invention.

In other words, it was found that when a phenol or a polyvinyl alcohol shown in Unexamined Published Japanese patent application No. 113509/1987 was used for a binding agent, the strength of a form decreased extensively and the form foamed on calcining. We have conducted the following experiments in order to obtain the compounds which will coincide with the object of the present invention. As a result thereof, it has been found that in the experiments of calcining a compound as a sole powder or as a form at a temperature of up to 1,000° C. for 4 hours, compounds which have a carbonized yield of less than 10% by weight or which have a carbonization yield of 10% by weight or more and will give a foamed carbonized product brings about in all cases either or both of the lowering of strength or the foaming of the form. In other words, we have found that on the selection of a water soluble binding agent essential for producing a granulated pulverulent body the compound is essentially a compound which has a remaining carbon yield of 10% by weight or more and the calcined product of which will not foam. These conditions are apart from the concept which has been a common sense in a granulating binding agent for ferrite or ceramics and that the compound of which carbon will be scattered at a temperature of around 500° C. is the best, and are unexpected for the person skillful in the art.

DETAILED DESCRIPTION OF THE INVENTION

Present Invention in General

Self-Sintering Carbonaceous Pulverulent Body

Figure 1:
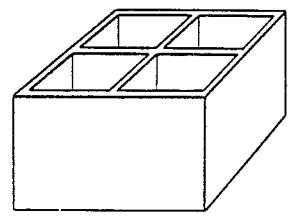
FIG. 1 is a perspective view of a thin follow box article produced with use of the granulated powder obtained by the process of the present invention.

The self-sintering carbonaceous pulverulent body used in the present invention can be defined as "a carbonaceous pulverulent body which can afford a form by pressing at an ordinary temperature and afford a calcined product by a carbonization reaction at a temperature from 500° to 600° C.".

Such a carbonaceous pulverulent body is a pitch, and as the pitch which can be used in the present invention there can be mentioned a pitch pulverulent body obtained by pulverizing a solid in a shape of a block which has been obtained by the distillation of a tar including a coal tar pitch, a petroleum residue tar pitch, an ethylene heavy end tar pitch and the like. It is also possible to use a modified pitch pulverulent body obtained by treating said, pitches with hydrogen or an organic compound as an electron donor (e.g. tetrahydroquinoline or decalin).

Optional Pulverulent Body to be Added

Among pulverulent bodies which will be added if desired, the graphite-rich carbon includes the powders of an earth-like graphite, a scaly graphite, an artificial graphite, a graphite fiber and the like. As the carbon-rich carbon, there can be mentioned powders of a petroleum coke, a coal coke, carbon black, a carbon fiber, a mesophase pitch micro bead and the like. As the inorganic compounds, there can be illustrated silica-alumina, $\gamma$-alumina, silicon carbide, silicon nitride, titanium carbide, silicon oxide and titanium oxide; as the metals, iron, copper, aluminum, zinc, tin, nickel, cobalt, gold, silver, platinum, titanium and lead; and as the metal oxides, copper oxide, lead oxide, iron oxide and the like.

As the mesophase containing and heat treated pitch materials, there can be mentioned a coal tar, a naphtha decomposed tar, a residual oil after distillation under reduced pressure, a coal pitch, a pitch obtained by distilling a naphtha decomposed tar, a hydrogen treated pitch, a solvent deposited pitch or the like.

The mesophase containing and heat treated pitch pulverulent body is obtained by heat treating for example the naphtha decomposed tar under reduced pressure or in an inert gas atmosphere and removing a light distilled fraction. It can be also granulated according to the present invention by further heat treatment to proceed the mesophase formation and then by pulverization.

The mesophase containing pitch pulverulent body and a pulverulent body comprising a filler the surface of which has been covered with said pitch can be produced by our inventions (Unexamined Published Japanese patent application Nos. 136906/1986, 251504/1986, 251505/1986 and 123007/1987).

The pulverulent body comprising a filler the surface of which has been covered with the mesophase-containing or heat-treated pitch used in the present invention can be also obtained by pouring the selected element into a tar to make a slurry, pouring the slurry into a solvent such as acetone or hexane, separating from the slurry a pulverulent body wherein a polynuclear aromatic polymer containing a mesophase containing pitch precursor has been deposited on the surface of the elements, subjecting the pulverulent body to heat treatment and further pulverizing the pulverulent body. As for this method, detailed description will be hereinbelow given in "Process for Producing a Starting Material for Granulation".

The mesophase containing pitch having lost completely the caking component which will act effectively during the temperature programming process from 500° to 600° C. by the high temperature treatment for a long period is not included in the element which can be utilized in the present invention.

In the process according to the present invention a mesocarbon microbead or a mesophase pitch pulverulent body is selected as a self-sintering carbon pulverulent body, a water slurry is formed together with a powder of a scaly graphite or an artificial graphite and the slurry thus obtained is granulated, so that both of the slidability on molding and the high heat conductivity and electric conductivity of a calcined form at a calcining temperature of about 1,000° C. can be simultaneously maintained. Metal powders such as copper, silver, iron and the like can also coexisted according to the necessity. It is also possible to give an excellent carbonaceous form which combines a high hardness with a high strength, is excellent in releasability and has a high electric conductivity and a heat conductivity by granulating a slurry obtained by mixing a self-sintering carbon powder wherein the surface of a graphite-rich carbon, a metal and an inorganic compound has been covered with a pitch or a mesophase containing pitch and a mesophase containing pitch powder.

According to the process of the present invention, a pulverized compound such as SiC, TiC, BN or the like or a precursor thereof can be selected as a constituent of a granulating pulverulent body to improve its oxidation resistance.

Slurry Concentration

The water slurry used in the present invention can be prepared by dispersing stably a carbonaceous powder into water by a wetting agent and adding thereto a binding agent for maintaining the particle shape of the granulating pulverulent body.

If the concentration of the carbonaceous pulverulent body in the slurry is higher, the cost can be reduced more extensively, and the concentration can be optionally selected by the designs of the drum diameter of a spray dryer, the amount of heated air, the amount and temperature of an superheated steam which is allowable to coexist and the middle particle diameter and particle size distribution of the granulating pulverulent body. It can be selected in a proportion of 5 to 300 parts by weight, preferably from 10 to 200 parts by weight to 100 parts by weight of water.

Binding Agent

As the binding agent used in the present invention, there can be mentioned water-soluble organic compounds such as preferably a variety of polymerization products of methylcellulose and hydroxycellulose, more preferably the polymerization products of which 2% aqueous solution has a viscosity from 25 to 2,000 cps.

The binding agent is preferably selected from those which have 10% or more, preferably 15% or more of the residual carbon yield on carbonization at 1,000° C. in an inert gas atmosphere, more preferably from those which will not form honey comb-shaped foams on the carbonization after compression molding of the pulverulent body and has a property of being baked into a mass. Other water-soluble compounds having such properties can be used as a binding agent of the present invention. Such binding agents can be used in an amount of 0.01 to 5 parts by weight, preferably from 0.02 to 4 parts by weight, more preferably from 0.05 to 3 parts by weight per 100 parts by weight of the carbonaceous powder.

If the binding agent is used in an amount exceeding 5 parts by weight, the strength of the carbonized product is decreased and the molded product is foamed. On the other hand, if the amount is less than 0.01 part by weight, the granulation of the carbonized product will be difficult.

Wetting Agent

As the wetting agent used in the present invention, there can be selected non-ionic surfactants having a clouding point at 25° C. or more, preferably in the range of 30° to 90° C.

As the wetting agent, there can be selected for example an alkylphenol-ethylene oxide adduct or an ethylene oxide-propylene oxide adduct, an oxyethylenepropylene block polymer (mean molecular weight: 2,000–8,000), an alcohol ethoxylate, a polyhydric alcohol ester, a polyethylene glycol ester and the like. Such wetting agents can be used in an amount of 0.01 to 3 parts by weight, preferably from 0.05 to 2 parts by weight, more preferably from 0.1 to 1 part by weight per 100 parts by weight of the carbonaceous powder.

If the wetting agent is used in an amount exceeding 3 parts by weight, the strength of the molded product is extensively decreased. On the other hand, if the wetting agent is used in an amount less than 0.01 part by weight, the dispersibility of the carbonaceous powder will remarkably deteriorate.

If the wetting agent according to the present invention is used, the carbonaceous pulverulent body of the present invention can be dispersed without containing air foam even in such a high concentration as 300 parts by weight per 100 parts by weight of water. The carbonaceous pulverulent body will generate no air foam even in the coexistence of the above-described binding agents. If the slurry contains air foams, the uneven particle diameter distribution and the hollowing of the granulated particles will affect deleteriously on the dimension stability of the molded product such as by the generation of cavity on compression molding or on the strength.

The amounts of the binding agent and the wetting agent can be defined appropriately within the above-described range according to the surface areas of the carbonaceous powder.

Spray Drying

The slurry of the carbonaceous powder can be instantaneously dried to recover the carbonaceous granulated powder with a usual spray dry granulating machine. Hot air can be used as a granulating thermal medium of the present invention. It is also possible to use a superheated steam-containing hot air. It is required for the upper limit of the hot air temperature not to exceed 200° C. The hot air loses sharply the temperature on contact with a slurry droplet, thus showing an inlet temperature of 180° C. and an outlet temperature of 100° C. If the dry carbon powder contacts with the air above 200° C., infusibilizing reaction proceeds, and the primary object for affording caking property to the molded product by the pitch according to the present invention cannot be accomplished. The granulated particle diameter is determined by many chemical technological factors such as the concentration and supplied amount of the slurry, the temperature and amount of the hot air, the coexisting amount of the steam, the droplet particle diameter, the drum diameter of the dryer or the like. The mean value of the granulated particle diameter can be selected from the range of 50 to 500 μm, preferably of 75 to 400 μm. If the particle is too small, the fluidity is inhibited. On the other hand, if the particle is too large, its uniform filling into a narrow mold cavity will be inhibited. The mean value of the particle diameter and the gap therefrom (particle diameter distribution) can be provided according to the thickness or shape of the molded product.

Process for Producing a Starting Material for Granulation

Among the self-sintering carbonaceous pulverulent bodies as an essential component of the present invention, a complex pulverulent body obtained by covering at least one of pulverulent bodies (matrix pulverulent body) selected from the group consisting of a graphite-rich carbon, a carbon-rich carbon, a metal and an inorganic compound with a mesophase containing pitch or a heat treated pitch has the excellent properties that (i) the range of particle diameter distribution can be selected at will; (ii) the heat treatment condition of the coated amount of the covering pitch can be selected according to the objects; (iii) the plurality of the matrix pulverulent bodies can be selected to afford novel functions which have not hitherto been obtained; and the like.

Main item of the present invention consists in a novel process for granulating a variety of carbonaceous pulverulent bodies. Furthermore, as the carbonaceous pulverulent body which can exhibit its characteristics to the uppermost by application of said granulation process, there can be mentioned a complex pulverulent body wherein the above-described matrix pulverulent body is covered with a mesophase-containing pitch or a heat treated pitch. This is because, while the process according to one embodiment of the present invention is characterized in that even an extremely fine matrix having a maximum particle diameter of primary particles of the complex pulverulent body of 1 μm or less can be coated with a pitch, a pulverulent body comprising such extremely fine primary particles has an extremely poor fluidity on molding. Accordingly, the pulverulent body cannot be filled uniformly into not only a small size precision molding apparatus but also a large size molding apparatus. As a result, it would be impossible to make a high density molded product, a fine diameter pored molded product or the like which are expected to be produced primarily by using such an extremely fine primary particle.

The combination of the granulation process of the present invention and the above-described fine matrix is capable of simultaneously solving the aforementioned problems and of producing a variety of molded products to which a desired property has been afforded.

PREFERRED EMBODIMENT

The technique of the embodiment of the present invention is described in detail below.

Background

Generally, when a carbon material such as a graphite electrode or the like is produced, there is widely employed a method for producing it by adding to a frame material which itself has no caking property and thus cannot directly afford a pressure molded product a pitch as a binder in a proportion of 30 to 40 parts by weight per 100 parts of the frame material and passing through the processes such as kneading, molding and calcining. However, in the calcining process, there are problems that in the temperature range of 300° to 600° C. at which temperature the binder pitch is fused and carbonized, a slow temperature programming rate of ca. 1° C./hour is required, many pores are generated due to a low carbonization yield of the pitch in the range of 50 to 60%, and thus the re-impregnation and secondary calcining of the binder pitch are required for affording denseness to the product.

For the purpose of solving these problems, many improvements have been proposed, such as Unexamined Published Japanese patent application No. 24211/1977 wherein an improved technique in relation to the mixing method of a frame material and a binder pitch is disclosed.

In the application, there are disclosed a process for producing a carbon-rich molded product, characterized in that a carbon-rich or graphite-rich powder is mixed with a pitch, the mixture is treated by heating at a temperature of 350° to 450° C. so that a mesophase resulting from the pitch is in an amount of at least 0.3 part by weight per 1 part by weight of the added carbon-rich or graphite-rich powder, the carbon-rich or graphite-rich powder and the mesophase are separated from the pitch, directly pressure molded and calcined, or a process for producing a carbon molded product comprising a carbon-rich or graphite-rich powder to which a mesophase is adhered, characterized in that on heat treatment of the pitch the carbon-rich or graphite-rich powder and the mesophase which have been obtained after the heat treatment so that substantially all of the pitch is transferred to the mesophase are pulverized, directly pressure molded and calcined.

The process described in the application is characterized in that:

(i) the mesophase is adhered around the added materials and thus no kneading process is required;

(ii) the carbonization yield of the mesophase is high and the carbonization does not proceed through the softened and fused state, so that a temperature programming rate of 100° C./hour or more can be employed; and (iii) the mesophase produced in the pitch invades into small cavities of the carbon-rich or graphite-rich powder and thus the porosity of the carbon-rich or graphite-rich powder itself will not affect on the carbonized molded product.

Japanese Patent Publication No. 39770/1983 discloses a process for producing a carbon-rich molded product, characterized in that a slurry comprising a carbon-rich frame material, a bituminous substance and a liquid medium, the whole amount or a part of the liquid medium soluble portion is filtered off to take up a solid product, and the solid product is pressure molded and then subjected to a thermal treatment. The frame materials used are various cokes, natural grahite, artificial graphite, carbon black, carbon fibers and the like and preferably contain a powder which will pass through the sieve having a mesh of 200 μm in a proportion of half or more of the total powder amount. The bituminous substance as a binding agent is coal tar, coal tar pitch, petroleum pitch, asphalt and a mixture thereof, and the invention according to the publication is characterized in that a bituminous substance from which all or a part of the so-called γ-resin (quinoline soluble and benzene soluble fraction) have been removed by a physical or chemical method is used.

As compared with the prior arts which couldn't produce a uniform molded product due to the difficulty for the binding agent pitch to be spread sufficiently over the surface of a carbon-rich powder even if a carbon-rich pulverulent body is blended for obtaining a dense product having a high strength, it is easy to disperse uniformly effective caking components in the bituminous substance over the pulverulent body. When a pulverulent body such as carbon black is used, the process according to the above-described invention has advantages in the points that simultaneous impregnation is possible while another process for spreading the caking components over the surface of carbon black in the prior arts. There are also disclosed advantages that the process having required hitherto a long term of 3 to 6 months can be shortened to 7 to 10 days according to the process of the above described invention and that harmful dust or mist which has been generated during the conventional processes such as kneading, cooling, secondary pulverization or the like can be dissolved in and removed by an organic solvent, so that operation circumstance can be maintained at a good level.

We have disclosed in Unexamined Published Japanese patent application No. 123007/1987 a process for producing a material for a carbonaceous complex molded product which comprises at least one of the elements selected from a graphite-rich carbon, a carbon-rich carbon, an inorganic compound, a metal and a metal compound and a mesophase containing pitch, characterized in that the following two processes are used:

(1) a process for suspending into a tar distillate containing a mesophase pitch precursor at least one of the elements selected from a graphite-rich carbon, a carbon-rich carbon, an inorganic compound, a metal and a metal compound; and (2) a process for heating the suspension system, removing a light distillate fraction contained in the tar distillate by the blowing of an inert gas or by suction under reduced pressure, and heat treating the mesophase pitch precursor at a temperature of 350° to 520° C. to obtain a carbon-rich precursor wherein 2-90% of the mesophase containing pitch is generated on the surface of the elements.

Problems to be Solved by the Invention of this Embodiment

In the process described in Unexamined Published Japanese patent application No. 24211/1977, it is disclosed that a process for separating a large amount of a pitch with an organic solvent such as quinoline or the like after resulting the mesophase is employed, an additional drying process is required after washing with benzene and acetone, and thus a complicated treatment process in relation to the kneading process is required.

On the other hand, in the process described in Japanese Patent Publication No. 39770/1983, it is apparent that additional problems of requiring an organic solvent such as benzene, toluene or the like in an amount from 20 to 50 times of the frame material, and of requiring a recovering process of γ-resin. The invention describes nothing for the covering of the mesophase pitch.

Although the process proposed in our Unexamined Published Japanese patent application No. 123007/1987 is an excellent process for producing a material of a carbonaceous complex molded product which is easy and excellent in reproducibility, it has become apparent that the problem of producibility in a large amount remains unsolved. That is to say, if a process for distilling off the light distillate fraction from a tar containing a mesophase pitch precursor by the blowing of an inert gas or the suction under reduced pressure is employed, the distillation is caused with the passage of time sequentially from a light boiling fraction to a higher boiling fraction in the components to be removed by distillation, so that a component distilled near the end of the mesophase forming reaction has a high viscosity, solidifies on cooling and thus can be removed only with an extensive difficulty.

When a large amount of a slurry is heat treated, problems of process operation such as causing the blocking of a tube during the reaction.

In the conventional processes, there have been found problems to be improved also in the aspect of productivity and energy efficiency that in order to obtain a complex molded product material comprising for example 18 parts by weight of carbon black and 82 parts by weight or a mesophase containing pitch 2,220 parts by weight of the slurry must be charged in a thermal treatment reaction tube to subject the whole to a thermal treatment at a temperature of 350° to 520° C.

Means for Solving the Problems According to this Embodiment

The present invention according to this embodiment has been conducted on the basis of such a situation, and the object is to provide a process for producing stably in an industrial scale a carbonaceous complex molded product material that at least one of the elements selected from a graphite-rich carbon, a carbon-rich carbon, an inorganic compound, a metal and a metal compound has been covered with a mesophase containing pitch or a heat treated pitch in the wide proportion of to the amount of the pitch.

The material is suitable for producing a carbonaceous complex molded product which is characterized by a high strength, a high speed carbonizability, a dimension stability, fine pores, a low electric resistance and the like.

We have supposed, on the basis that the problems in the thermal treatment process disclosed in our preceding invention (for example Unexamined Published Japanese patent application No. 123007/1987) consist in the difficulty of removing a higher boiling fraction which is distilled during the thermal treatment process and has an extremely high viscosity and its tube blocking property, that a stable production of a carbonaceous complex pulverulent body in an industrial scale may be maintained if a technique which is disclosed in Unexamined Published Japanese patent application No. 89215/1986 and is related to the extraction of a polynuclear aromatic polymer from a tar oil can be applied to a filler co-existing system.

However, we could not get a prospect for producing a carbonaceous complex pulverulent body within a range which can be easily presumed on the basis of Unexamined Published Japanese patent application No.

89215/1986, since there remained many unknown factors in whether the polynuclear aromatic polymer can be adhered uniformly to the surface of a filler, whether the pitch having been subjected to thermal treatment can act equivalently with the conventional mesophase containing pitch and the like. In order to obtain a prospect in relation to the problems, a small scale preliminary experiment was conducted with application of the typical extraction condition disclosed in Unexamined Published Japanese patent application No. 89215/1986.

Preliminary Examination:

A slurry where 1 part by weight of a scaly graphite (manufactured by NIPPON KOKUEN, in a tradename of CPB) has been suspended into 6.6 parts by weight of an ethylene heavy end tar was contacted with 19.8 parts by weight of acetone to deposit a polynuclear aromatic polymer described in Unexamined Published Japanese patent application No. 89215/1986. On a suction filter, an acetone soluble fraction was filtered and washed off, and the deposited product was air-dried on a heating plate at a temperature of 60° C. to obtain 1.94 parts by weight of a dry powder. The whole of the dry powder exhibited a uniform brown color and had a fluidity which required no pulverizing procedure. The CPB was black and the whole powder thus obtained was brown, so that it was easily presumed that the polynuclear aromatic polymer deposited uniformly on the surface of the CPB. The dry powder was further subjected to thermal treatment at 465° C. for 15 minutes using a thermal treatment apparatus described hereafter to obtain 1.29 parts by weight of a complex pulverulent body.

In the thermal treatment process, there had been observed a result distinguishably different from that in the prior art. That is to say, as will be shown from the fact that 1.94 parts of the dry powder losed 0.65 part by weight during the thermal treatment to give 1.29 parts by weight of the complex pulverulent body, there was obtained a result remarkably specific in the point that about 69% by weight of the polynuclear aromatic polymer having been deposited on the CPB is decomposed and distilled off during the thermal treatment to be taken out of the reactor, while no higher boiling fraction which will adhere strongly to a distillation tube or cause the blocking of the tube is present.

The phenomenon is a sole effect was expected when the technique disclosed in Unexamined Published Japanese patent application No. 89215/1986 was intended to ge applied to the present invention. However, the object of the technique disclosed in Unexamined Published Japanese patent application No. 89215/1986 was intended for the adhesive polymer not to be included in the polynuclear aromatic polymer and no indication has been made in relation to the behavior of the large amount of a distillate containing a decomposed product which will generate upon thermal treatment of the polynuclear aromatic polymer at a high temperature of 300° to 520° C. which has been required by the present inventors.

The complex product obtained by the mesophase forming reaction at a higher temperature is a non-caking substance which is easily disintegrated, and thus different from the complex obtained by the thermal treatment process according to our preceding invention in the points that the preceding complex becomes blocks in the reactor and also adheres partially to the wall of the reactor.

The complex pulverulent body had a uniform deep grey appearance, and thus it could be easily judged that the mesophase-containing pitch covered uniformly the surface of the CPB.

The complex pulverulent body was molded into a plate with a cold press at a pressing pressure of 0.5 ton/cm$^2$ and was carbonized in an inert gas atmosphere at a programming temperature up to 1,000° C. for 9 hours. The bending strength of a carbon molded product thus obtained was 200 kg/cm$^2$, which was equivalent to that of the molded product produced according to the conventional process.

It was found that these facts that by employing the process for crystallizing the polynuclear aromatic polymer on a filler, a carbonaceous complex material which can afford the equivalent molded product properties to those of the conventional process can be produced along with overcoming the problems on the production processes. This led to the achievement of the present invention according to this embodiment.

In order to achieve the invention according to this embodiment, detailed examination was conducted for the following crystallization-governing items.

(1) Process for Suspending an Element into a Tar Fraction

Explanation is conducted referring to an element (sometimes referred to hereinafter as "filler") on which should be crystallized a mesophase-containing or heat-treated pitch.

As the graphite-rich carbon, there can be mentioned for example a scaly natural graphite, an earth-like natural graphite, an artificial graphite, a graphite fiber or the like. As the graphite-rich carbon characteristic of the process according to the present invention in this embodiment, there can be mentioned a graphite powder which can produce a molded product by pressure molding at ordinary temperature (e.g. CPB, CSSP and ASP-1000 (trade name), manufactured by NIPPON KOKUEN KOGYO K.K.; KS-2.5 (trade name), manufactured by LONZA Co.). As the carbon-rich carbon, there can be mentioned for example petroleum cokes, coal cokes, carbon black, carbon beads and carbon fibers. As the variety of inorganic compounds, there can be mentioned for example silica-alumina, $\gamma$-alumina, $\alpha$-alumina, silicon carbide, silicon nitride and the like. The metal includes for example iron, copper, zinc, tin, nickel, cobalt, lead, aluminium, gold, silver, titanium, platinum, palladium and the like. These metals can be also present partly or wholly as metal oxides or metal compounds before they are out into a slurry and incorporated into a molded product. The metal compounds include for example $Fe_2O_3$, $ZnO$, $CuO$, $CuCl_2$, $ZnCl_2$, $SnCL_4$, $AlCl_3$, $TiCl_4$, $Cu(NO_3)_2$, titanate surface coats (e.g. TITACOAT®, manufactured by Nippon Soda Co., Ltd.), silicate surface coats and the like.

On the practice of the present invention in this embodiment, the filler can be used singly or as a mixture of the two or more. Specific examples of the mixture of the two or more include graphite and carbon; carbon and inorganic compounds; carbon and metals; graphite, carbon and inorganic compounds; etc. Further examples of the combination of the filler include a carbon which has been preliminarily metallized with a metal such as copper, nickel or the like.

The tar fractions used as a material of the mesophase containing or heat treated pitch used in the present invention is not necessary limited to particular types, and thus either a coal type tar or a petroleum type tar can be used. However, the type of the tar is often selected depending on the properties required for the final products. For instance, when it is not desired for a final product to be contaminated by heavy metals, sulfur or the like, an ethylene heavy end tar obtained by the degradation of naphtha is preferably used rather than a coal tar or a heavy component tar of petroleum.

Furthermore, when an element has a large oil absorbing amount and thus a slurry will not be formed by suspending the element into only a tar fraction containing a mesophase or heat treated pitch precursor, a proper solvent which will not deposit a tar heavy fraction such as a light fraction recovered from the heat treatment process or quinoline can also be added appropriately.

The amount of the filler is proportion to the tar fraction is different depending on the sorts of the tar fractions and fillers and are selected so that the amount of a mesphase containing pitch which coves the filler is in the range described hereinafter.

Suspension is performed by an ordinary method. However, if a large amount of water is contained which may prevent the tar fraction from completely wetting the surface of the filler, it is preferable to dry and deaerate the filler preliminarily. When the difference of the densities of the tar fraction and the filler is large, it is desirable to make some procedures in order to avoid the separation of the these components.

(2) Process for Depositing Solvent Insoluble Components

In our prior invention, we have proposed a process for producing a material for a complex molded product wherein the distillation of a light fraction in a tar and the mesophase formation of a residual heavy fraction are performed in a simultaneously thermal treatment step. Although the present invention in this embodiment has increased steps than in the prior proposal, this embodiment is characterized in that the step is divided into a step for obtaining a mixture by depositing on the surface of a filler a heavy fraction containing a mesophase pitch or heat treated pitch precursor which is contained in a tar and a step of generating a mesophase containing or heat treated pitch on the surface of the filler by heat treating the mixture under an inert gas atmosphere.

A process for contacting a homogeneous phase solution with an organic solvent having a relatively low solvent power for a heavy fraction is known as a method for depositing a heavy fraction from an organic compound homogeneous phase. On the other hand, as is apparent from Unexamined Published Japanese patent application No. 89215/1986 in the name of the present assignee, when a polynuclear aromatic polymer is recovered from an ethylene heavy end tar by the method disclosed in the Publication, it is sufficient to use a specific solvent under a specific condition for preventing the contamination of a pitch-like polymer having an extremely high viscosity into the polynuclear aromatic polymer as a target.

Polymer Depositing Solvent

The solvents used in the present invention in this embodiment are one or more solvents selected from (1) aliphatic or alicyclic hydrocarbons having 5-20 carbon atoms, preferably 5-8 carbon atoms and (2) aliphatic or alicyclic ketone compounds having 3-20 carbon atoms, preferably 3-8 carbon atoms.

The aliphatic or alicyclic hydrocarbons having 5-20 carbon atoms, preferably 5-8 carbon atoms in the group (1) may be saturated hydrocarbons or unsaturated hydrocarbons, and the aliphatic hydrocarbons may be in straight chain or in branched chain.

The saturated aliphatic hydrocarbons include for example n-pentane, methylbutane, ethylpropane, n-hexane, n-heptane, n-octane, n-nonane, n-decane, 2,3-diethylhexane, 2,3,5-trimethylheptane, n-dodecane, 3-ethyl-5-butyloctane, n-pentadecane, 3-methyl-6-methyldecane, n-octadecane, n-nonadecane, etc. The saturated alicyclic hydrocarbons include for example cyclopentane, cyclohexane, decaline, 2-methyldecaline, heptylcyclohexane, octylcyclohexane, dodecylcyclopentane, etc.

The unsaturated aliphatic hydrocarbons include for example 1-pentene, 1-hexene, 2-methyl-1-pentene, 1-heptene, 3-ethyl-1-pentene, 1-octene, 3-methyl-1-octene, 1-decene and the like. The unsaturated alicyclic hydrocarbons include for example cyclopentene, cyclohexene, 2-methylcyclohexene, 2-ethylcyclopentene, 2-propylcyclopentene, 2-butylcyclopentene and the like.

As the solvent (i) according to this embodiment of the present invention, there are used the compounds illustrated above and mixtures thereof, preferably n-pentane, n-hexane, n-heptane, cyclopentane, cyclohexane, cyclopentene, cyclohexene, 2-methylcyclohexene and mixtures thereof. Furthermore, a light gasoline fraction, a heavy gasoline fraction, a kerosene and mixture thereof which are obtained by distillation at ordinary pressure of a crude oil as a mixture of a variety of the above-described hydrocarbons can be also used for the solvent according to claim 3 of the present invention.

As the aliphatic or alicyclic ketone compounds having 3-5 carbon atoms, preferably 3-4 carbon atoms, (ii) according to this embodiment of the present invention, the hydrocarbon may be saturated or unsaturated and the hydrocarbon portion of the aliphatics may be in straight chain or in branched chain.

As the saturated aliphatic ketone compounds, there are used for example acetone, methyl ethyl ketone, diethyl ketone, methyl propyl ketone, methyl isopropyl ketone and the like. As the saturated alicyclic ketone compounds, there are used for example cyclobutanone, cyclopentanone and the like.

As the unsaturated aliphatic ketone compounds, there are used for example vinyl methyl ketone, allyl methyl ketone and the like. As the unsaturated alicyclic ketone compounds, there are used for example cyclobutenone, cyclopentenone and the like.

As the solvent (ii) according to this embodiment of the present invention, there are used the compounds illustrated above and mixtures thereof, preferably acetone.

The solvent herein refers at least to one compound selected from the compounds (i) and (ii). It may be a pure product or may contain a small amount of water as an impurity.

Added Amount of the Solvent and a Process for Adding It

The solvent according to this embodiment of the present invention is added for the two different purposes of (A) directly mixing it with a tar oil as a starring material thereby selectively depositing a polynuclear aromatic having a high molecular weight and (B) washing the deposited polymer, that is, rinsing it.

In the method including only the direct addition and mixing procedures without rinsing, an adherent polymer remains and is distilled out in the thermal treatment step as a heavy fraction which tends to block a tube unless the solvent proportion is set at a much higher level than (A)+(B). Thus, such a method is not suited for the object of the present invention.

Although the sort of the solvents in (A) and (B) can be changed inbetween, the same solvent is preferred for both the purpose (A) and (B) from the aspect of economy in the recovery of solvents.

The specified solvent ratio in the present invention can be referred to as a solvent ratio for mixing (per weight of a raw material tar) $S_M$ in the range of 2 to 15, preferably 3 to 10, more preferably 3 to 6 or as a solvent ratio for rinsing (per weight of a raw material tar) $S_R$ in the range of 1 to 15, preferably 1 to 8, more preferably 2 to 6.

If the solvent ratio for mixing is smaller than the aforementioned ranges, the dry powder will be contaminated by the adherent polymer. If the solvent ratio is larger than the aforementioned ranges, the process is not economical. Thus, these solvent ratios are not suited for the object of the present invention.

Similarly, if the solvent ratio for rinsing is smaller than the aforementioned ranges, the dry powder will be contaminated by the adherent polymer; if larger than the aforementioned ranges, the process is not economical. Thus, these solvent ratios are not suited for the object of the present invention.

The extraction yield of the polynuclear aromatic polymer from a tar oil varies depending on the sort of solvents, the $S_M$ ratio, the $S_R$ ratio and extraction temperature. Moreover, the greater part of the polynuclear aromatic polymer is released from the solid content by vaporization and decomposition during the subsequent thermal treatment step, and thus, when the ethylene heavy end is concerned, the final pitch yield remains in the range of 4 to 6 parts by weight per 100 parts by weight of a tar. Accordingly, it is necessary to determine the extraction amount of the polynuclear aromatic polymer from the tar oil also from the aspect of the modification degree of the tar oil itself, that is the degree of suppressing the residual amount of the polynuclear aromatic polymer deposited by the coexistence of a poor solvent. On the other hand, if washing is insufficient, the properties of a complex pulverulent body are seriously affected by such a phenomenon as fusing during the thermal treatment step.

The extraction amount of a heavy polynuclear aromatic polymer remaining in the complex pulverulent body after thermal treatment tends to vary depending on the extraction temperature, a wide range of the fluctuation of the extraction temperature should be avoided in the case of a solvent having a high extractability. On the other hand, the fluctuation of the extraction temperature is permitted over a wide range in the case of a solvent having a low extractability. Accordingly, as for the extraction temperature and its fluctuation range, their maximal ranges are determined depending on the sort of the solvents used within the above specified ranges.

(3) Solid-Liquid Separation and Washing Steps (Separation of a Solvent for Mixing)

The contact of the solvent for mixing with a tar oil slurry instantaneously causes the deposition of a polynuclear aromatic polymer on a filler. In order to obtain a deposition equilibrium under a certain deposition condition, it is desirable to conduct mixing treatment for at least several minutes followed by the separation procedure of a solvent soluble fraction and a solid fraction.

The amount of the solvent-soluble fraction removed after the mixing treatment also dominates the washing effect in the subsequent operation and should be increased as much as possible. As the solid-liquid separating method suitable for this object, there can be mentioned suction filtration with a suction filter and solid-liquid separation by means of a centrifugal separator. There can be also mentioned a general method for caking a slurry and separating a filtrate by means of a HUNDA filter or the like. On the other hand, if the slurry is formed into a cake, complicated operations such as the transportation and disintegration of the cake are required for the complete washing of the cake with a rinsing solvent.

We have found a phenomenon that even in a mixed slurry system in which a polynuclear aromatic polymer has been deposited on microfine graphite particles having a mean particle diameter of 1 $\mu$m, when a mixing and agitation apparatus is stopped solid contents are deposited quickly and an equilibrium state is achieved in several minutes in a 500 liter reactor. We have confirmed that the suction method (decantation method) of a supernatant with use of this phenomenon is very effective for removing the solvent soluble portion.

Washing Operation

When the decantation method is used, the deposited residue from which the mixing solvent has been removed is transferred to a complete suspension state instantaneously upon starting the agitation with adding a rinsing solvent, no floatation of a cake-like solid is recognized, and homogeneous washing can be accomplished in a short time. The mixing deposition and the washing are performed in the same bath and the operations such as the transfer of the slurry and the recharging of the cake can be omitted, so that this method is very effective for avoiding the risks on safety and sanitation such as the release of the organic solvent into atmosphere or the exposure of operators to the organic solvent. Moreover, the suction of the supernatant is performed with an appropriate suction tube, and the supernatant can be transferred easily to a solvent reservoir by applying pressure with nitrogen to a reactor. A solvent transfer pump can also be used. When a suction filter or a centrifugal separator is employed, a solvent soluble portion can be removed by pouring a certain amount of a rinsing solvent onto the cake from which the mixing solvent has been removed. In order to perform washing completely and to obtain a homogeneously coated pulverulent body, the solid is preferably washed in the form of a slurry. For this purpose, it is preferred to remove the mix solvent and the solvent-soluble portion by the decantation method rather than the cake formation. It is necessary to conduct washing operation at least once, preferably twice or more.

When two or more washing operations are repeated, washings except for the ones of the final operation are preferably removed by decantation method. As for the final washings, it is preferred to remove the washing solvent and the solvent soluble portion as much as possible by the known solid-liquid separation means such as a pressure filter, a suction filter, a HUNDA filter or the like. Among these means, a centrifugal separator is a solid-liquid separation means in accordance with this purpose.

(4) Drying Step

A filler coated with a polynuclear aromatic polymer will not become a free-flowing pulverulent body even if a solvent and a solvent-soluble portion are removed as much as possible, so that it is necessary further to remove the solvent in a drying step.

It should be noted that the temperature of the filler must not be raised before the solvent is substantially removed. If the temperature of the filler is raised while the solvent still remains, the extractability of the solvent is enhanced and the polynuclear aromatic polymer is dissolved in the solvent thus inducing an undesirable phenomenon such as fusing of the pulverulent bodies. As the removing method of the solvent, there can be mentioned vacuum drying under heating, hot air blow drying, or the like. Drying with use of steam can be also used, but it is necessary to pay attention so that the temperature will not be raised before the solvent is not removed.

(5) Solvent Recovery Step

The filtrate after extraction and the solvent used in rinsing are separated into a solvent and an oil by an ordinary distillation procedure or flushing, and a low viscosity oil is obtained. The low viscosity oil does not contain a polymer fraction which will deposit depending on a solvent or a low temperature range and can be easily handled. Moreover, it has an advantage that a polymer will not deposite even if it is blended and used with other fuel oils.

(6) Thermal Treatment Step

The mesophase-containing or thermally treated pitches which satisfy the requirements of the present invention are produced by thermally treating the dry powder comprising a filler coated with a polynuclear aromatic polymer coated filler at a temperature range of 300° to 520° C., preferably 320° to 500° C. In other words, we have found that the pulverulent body coated with the polymer according to the process of the present invention will give the properties appropriate to the granulation process of the present invention by the thermal treatment at a wide range of temperature from 300° to 520° C. In our prior thermal treatment process, the temperature range of the thermal treatment was set up from 350° to 520° C., mainly because even if the treatment was continued for a long time at a temperature of 300° to 350° C. at which the mesophase formation did not proceed, the light boiling fraction which would induce foaming or cracking on the carbonization of the molded product was not removed smoothly. However, in the process of the present invention, it was found that even with a thermally treated pitch containing substantially no mesophase pitch any blistering or cracking was not generated in a molded product made of the pulverulent body. That is, when the mesophase-containing or heat-treated pitch in the process according to this embodiment of the present invention is obtained, it is possible to produce in a large scale a precision molded product having excellent properties such as a high strength, a high speed carbonization, a dimension precision or the like by the granulation process according to the present invention and to control freely the pitch content and various physical properties such as electric resistance, dimension precision, strength, surface smoothness, etc.

The temperature of the dry powder is raised to a reaction temperature under flow of an inert gas such as nitrogen gas, carbon dioxide gas, argon gas or the like, maintained at the temperature for a certain time and then lowered to obtain a complex product in which the surface of the filler has been coated with the mesophase-containing or heat-treated pitch. The amount of the mesophase-containing or heat-treated pitch in the complex is in a proportion of 3 to 3,000 parts by weight to 100 parts by weight of the filler. When the volume contraction of the molded complex upon carbonization is intended to maintain in a small extent, the amount of the mesophase-containing or heat-treated pitch is in a proportion of 3 to 100 parts by weight, preferably 5 to 50 parts by weight, more preferably 10 to 40 parts by weight to 100 parts by weight of the filler.

The amount of the quinoline soluble fraction of the mesophase-containing or heat-treated pitch can be selected in the range of 0.1 to 90% by weight, preferably 0.5 to 70% by weight, more preferably 1 to 50% by weight.

It has been found that the mesophase-containing or heat-treated pitch complex obtained with use of the dry powder of the present invention does not adhere to a reactor wall after reaction or a gas blowing tube and that the complex having the pitch content of 30% or less is recovered as a complete pulverulent body. The phenomenon not only makes easy the taking out of the complex from the reactor but also brings about an epoch-making effect on the production in an industrial scale of the complex in the point that an agitation apparatus can be provided in order to make uniform the thermal treatment in a large size reactor.

The majority of the polynuclear aromatic polymer in the dry powder is distilled out of the reactor in the mesophase producing or thermal treatment reaction. The distillate has a low viscosity and thus can be used directly for a fuel oil. No phenomenon such as the adhesion to the wall of a distilling tube or a reservoir or thickening of the distillate with the passage of time which causes process problems was not recognized.

Advantageous Effect of the Invention

By the practice of the production process according to the present invention, a carbonaceous complex molding material in which the surface of a filler is covered with a mesophase-containing or heat-treated pitch can be produced in a large amount without causing process problems.

The process of the present invention is characterized in that the two steps of the coating of the surface of a filler with a pitch containing mesophase pitch precursor and the mesophase formation of the precursor which have hitherto been performed simultaneously in the thermal treatment step in the previous invention by the present inventors have been divided into separate steps, i.e. a step in which the polynuclear aromatic polymer is deposited on the filler as coat, washed with a solvent and dried to obtain a dry powder from which viscous pitch fractions which will cause the caking of the powder product have been preliminarily removed and a step in which the dry powder is thermally treated in an inert atmosphere to powder product such that the surface of the filler is coated with the mesophase-containing or heat-treated pitch.

Although the increase of the number of steps should be avoided in principle because it brings about the increase in cost, the production process of the present invention finally has the effects which bring about the sharp reduction of cost in the following points as compared with the conventional one-step thermal treatment:

(1) The light-solvent-soluble fraction of a tar from which the polynuclear aromatic polymer has been removed can be utilized as a fuel oil of good quality which will not deposit a polymer fraction after a solvent such as acetone or the like has been fractionated. In the conventional process, only a distillate containing additionally a high viscosity fraction which tended to cause the blocking of a tube was obtained and thus additional treatments such as redistillation or the like were essential.

(2) In the conventional process, it was required to charge a large amount of a slurry into a thermal treatment reactor and to subject the slurry to the thermal treatment up to a high temperature for the preparation of a carbonaceous complex molding material which contains a large amount of a mesophase-containing pitch. On the other hand, in the process of the present invention, a dry powder is charged into a thermal treatment reactor, and thus the productivity of the carbonaceous complex pulverulent body per unit volume of the thermal treatment reactor is remarkably increased. The material does not adhere to the wall material of the reactor even after the reaction is completed, so that a large size thermal treatment reactor equipped with an agitator such as a rotary kiln can be used to ensure that homogeneity of heat diffusion in an externally heating reactor and thus the homogeneity of the thermal treatment reaction. Accordingly, the large amount productivity can be ensured.

(3) The fraction obtained by vaporization at the thermal treatment of the dry powder is a light matter and contains no high viscosity fraction which will vaporize according to the conventional method, and many operations other than those of the reaction such as the cleaning accompanied with the narrowing of the distillation tube or the countermeasure to the blocking of the tube can be omitted extensively.

Summing up, the present invention according to this embodiment is characterized in that in a process for producing a carbonaceous complex molded product comprising at least one element selected from a graphite-rich carbon, a carbon-rich carbon, an inorganic compound, a metal and a metal compound and a mesophase-containing pitch or a thermally treated pitch, the following 3 steps are used:

(1) a step for preparing a slurry by suspending at least one element selected from a graphite-rich carbon, a carbon-rich carbon, an inorganic compound, a metal and a metal compound into a tar fraction which contains a mesophase-containing or thermally treated pitch precursor, (2) a step for separating a mixture comprising the element and a polynuclear aromatic polymer which contains the mesophase-containing or thermally treated pitch precursor by adding to the slurry at least one solvent selected from (i) an aliphatic or alicyclic hydrocarbon having 5-20 carbon atoms and (ii) an aliphatic or alicyclic ketone compound having 3-5 carbon atoms in a mixing solvent ratio ($S_M$) of 2-15 (solvent weight/raw material tar weight), treating the mixture at a temperature of 0° to 60° C. to deposit a polynuclear aromatic polymer which contains the mesophase-containing or thermally treated pitch precursor on the surface of the element, separating the solvent-soluble fraction in the tar fractions together with the solvent from the solid component, subjecting the resulting cake and/or slurry to at least one washing treatment with a solvent selected from the groups (i) and (ii) referred to above in a rinsing solvent ratio ($S_R$) of 1-15 (solvent weight/weight of raw material tar fraction) at a temperature of 0° to 60° C., and removing the solvent and the solvent-soluble fraction from the obtained mixture, and (3) a step for heat treating the mixture under an inert gas atmosphere at a temperature of 300° to 520° C. to convert the polynuclear aromatic polymer deposited on the element to a mesophase-containing or heat-treated pitch.

The present invention is further specifically explained with reference to Examples below.

EXAMPLE 1

A 80.1 kg portion of an ethylene heavy end tar (EHE tar) was charged into a 500 liter explosion-proof reactor equipped with an agitation blade and an external jacket type cooling water circulating device. A 16.0 kg portion of a scaly graphite (tradename, CPB; manufactured by NIPPON KOKUEN KOGYO K.K.) was charged into the reactor while agitating the content at a condition of 110 rpm at room temperature to prepare a slurry. After the temperature of the reactor was adjusted to 20° C., the reactor was maintained in a reduced state of 11 cmHg by a vacuum pump and 253.3 kg of acetone was charged into the reactor through a valve to contact it with the slurry at one stroke. Under a nitrogen atmosphere, agitation was continued for 10 minutes at 110 rpm and then stopped, and the content was left standing for 30 minutes. A 191.1 kg portion of a supernatant (specific gravity 0.840) was transferred to a solvent tank with a supernatant suction apparatus. A 127.0 kg portion of acetone for rinsing was charged into the reactor with a solvent pump, and the polynuclear aromatic polymer was washed at 20° C. for 10 minutes at a condition of 110 rpm of agitation. Then the reactor was stopped for 60 minutes. A 76.2 kg portion of a supernatant (specific gravity 0.815) was transferred to a solvent tank with a supernatant suction apparatus.

A 53.0 kg portion of a rinsing acetone was charged into the reactor with a solvent pump, and the polynuclear aromatic polymer was washed at 20° C. for 10 minutes at a condition of 110 rpm of agitation. The agitation was stopped and 268.0 kg of the slurry was taken out from the bottom part of the reactor and transferred to a metal drum. The slurry remaining in the reactor was washed out with 10.0 kg of acetone.

The slurry was loaded with a centrifugal force of 600 G with a filter sheet type explosion-proof centrifugal separator having a liquid retention amount of 66 liters to separate a filtrate. A portion (10 kg) of the filtrate was used for washing out of the slurry remaining in the metal drum, and the mixture was also subjected to centrifugal separation to obtain 225.7 kg (specific gravity 0.808) of a filtrate.

A dry cake 33.25 kg was obtained, spread onto a square pad of 1 m×1 m, dried in an explosion-proof dryer with blow of air at ordinary temperature for 16 hours to obtain 27.16 kg of dry pulverulent body.

To an external heating rotary kiln having an internal diameter of 155 mm and an effective heating length of 680 mm at each end of which a separation wall having a gas aperture is provided was charged 1.6 kg of the dry pulverulent body, an inert gas was introduced under the conditions of 0.2 rpm of rotation speed, $N_2$ supply of 30 lit/min and $N_2$ temperature of 380° C. to raise the temperature of the reactor up to 350° C. in 1.5 hours. The temperature of the reactor was maintained at 350° C. for 1 hours. Then the rotation speed was raised up to 7 rpm and the temperature of the reactor was raised up to 390° C. in 0.5 hours. The reactor was maintained at a temperature of 390° C. for 2 hours. Then the heating of the kiln and $N_2$ was stopped and left cooling, and a mesophase pitch-containing complex powder was obtained in an amount of 0.94 kg. The pitch content in the complex powder as 19.6% by weight.

The complex powder was pulverized with a YARIYA precision pulverizing machine to recover a pulverulent body having a particle diameter of less than 150 μm in a yield of 98% by weight.

A 450 g portion of the pulverulent body was charged into a solution in which 4.5 g of methylcellulose 80-120 cps (manufactured by NAKARAI KAGAKU YAKUHIN) and 3.2 g of SN WET 366 (manufactured by SUN NOPCO Co., solid content: 70%) had been dissolved in 900 g of water, and the mixture was agitated to obtain a slurry. The slurry was granulated with a spray dryer FOC-16 (manufactured by OGAWARA KAKOKI K.K.) under a granulation condition of an atomizer diameter of 65 mm, a rotation speed of 10,000 rpm, a hot air temperature of 180° C., a hot air supply of 5 $m^3$/min and a slurry spraying amount of 0.13 kg/min to obtain a granulate having a mean particle diameter of 114 μm.

The granulate was charged into a mold cavity which is provided in a rotary pressing machine (manufactured by SUGAWARA SEIKI K.K.), model 400-1P and is designed to produce a thin hollow box product having a 1.2 mm thick bottom plate and a cross type partition as shown in FIG. 1, and a continuous production was conducted with setting up a product density at 1.62 g/cc in the speed of 6 rpm.

The product thus obtained was calcined with setting up a temperature programming time up to 1,000° C. for 9 hours to obtain a calcined product having a calcined product density of 1.6 $g/cm^3$ in the same dimension precision as that of the mold.

The granulate was molded on a plate having a width of 12.7 mm, a length of 63.5 mm and a thickness of 5.0 mm with a molding pressure of 1.5 ton/$cm^2$, and the temperature was raised up to 1,000° C. in 9 hours under the stream of argon. The molded product was maintained at a temperature of 1,000° C. for 1.5 hours and cooled in an oven. The three point bending strength of the carbon form was measured to obtain a value of 405 kg/$cm^2$. The bulk density of the product was 1.78 g/cc.

EXAMPLE 2

In the same manner as in Example 1 except that a nonylphenol 10EO (clouding point: 61° C., EMULGEN 910, manufactured by KAO K.K.) was used as a wetting agent, a slurry was prepared. No difference was observed in its product properties as those in Example 1.

EXAMPLE 3

In the same manner as in Example 1 except that a Pluronic type surfactant (clouding point: 40° C., EPASI 420, manufactured by DAIICHI KOGYO) was used as a wetting agent, a slurry was prepared and a granulate was obtained. No difference was observed in its product properties as those in Example 1.

COMPARATIVE EXAMPLE 1

In the same manner as in Example 1 except that 1 g of a nonylphenol 6.0EO adduct (clouding point: lower than 20° C.) was used as a wetting agent, the preparation of a slurry was tried, but a complete dispersion system could not be obtained.

EXAMPLE 4

A slurry obtained by dispersing 800 g of a mesophase pitch powder (MS, manufactured by KUREHA CHEMICAL INDUSTRY CO., LTD.) and 200 g of a scaly graphite (trade name: CPB, manufactured by NIPPON KOKUEN KOGYO K.K.) in 2,000 g of water containing 1 g of methylcellulose (manufactured by TOKYO KASEI KOGYO K.K.; 80-120 cps, 20° C., 2% aqueous solution) and 0.5 g of a wetting agent (manufactured by SAN NOPCO CO., WET 366) was subjected to granulation by means of a spray dryer SD-12.5 (manufactured by ASHIZAWA NIRO ATOMIZER K.K.) under a granulation condition of a slurry supply rate of 21 kg/hour, an air supply of 20 $m^3$/min and an air temperature of 170° C. to obtain a granulate having a mean particle diameter of 100 μm. The angle of repose was 34°.

The granulate thus obtained was molded into a plate having a width of 12.7 mm and a length of 63.5 mm, and the temperature was raised up to 1,000° C. in 10 hours under the stream of pre-heated nitrogen. The molded product was maintained at a temperature of 1,000° C. for 1.5 hours and cooled in an oven. The three point bending strength of the carbon form was measured to obtain a value of 658 kg/$cm^2$. The hardness of the product measured in accordance with ASTMD 2240 was 87.

Using a cylindrical mold having an external diameter of 27.45 mm and an internal diameter of 16.90 mm, molding was performed under a pressure of 1.5 ton/$cm^2$ to obtain a molded product having a thickness of 7.6 mm. The molded product was calcined at a temperature up to 1,000° C. in a temperature programing time of 20 hours and a retaining time of 3 hours to obtain a carbon molded product having the average sizes of an external diameter of 25.04 mm, and internal diameter of 15.35 mm and a thickness of 6.92 mm. The maximum difference of the individual sizes in the plurality of molded products from the average sizes is 38 μm in external diameter, 20 μm in internal diameter and 35 μm in height. The bulk density of the ring-shaped molded product was 1.66.

EFFECT OF THE INVENTION

When a granulated carbonaceous powder prepared according to the process of the present invention is used, various types of carbon molded products can be designed. For example, a complex powder that a scaly graphite is coated with a mesophase containing pitch can be prepared by our prior techniques. (Unexamined Published Japanese patent application Nos. 136906/1986, 251504/1986, 251505/1986 and 123007/1987) and granulated according to the process of the present invention. An ungranulated product was not flown into a cavity of the box mold shown in FIG. 1. However, the granulated product was easily flown into the cavity, and thus complicated thin articles having a 1.2 mm thick bottom as illustrated in FIG. 1 can be produced in a continuous automatic operation without an operator personnel. Referring to the productivity, such an article can be molded for example at least 80 pieces/min. With a rotary press, model 400-1P (manufactured by SUGAWARA SEIKI K.K.). That is, a large number of pieces of 38,400 can be produced in an 8 hour operation. Such a machine can be operated automatically overnight without an operator personnel, and thus the huge productivity of a pressing machine is apparent. Moroever, it can simultaneously produce not only the same kind of products but also at the maximum 8 different shaped molded products. In this case, the production of the respective molded products is reduced to ⅛, but it is still possible to produce respectively 4,800 pieces in an eight hour operation.

The advantage of the production of a molded product according to the granulated powder of the present invention is exhibited also in a calcining step. That is, in the case of a thin molded product as illustrated in FIG. 1, calcining time can be extensively reduced. This is probably because the mesophase containing pitch has a residual carbon yield exceeding 80% by weight, so that the amount of a gas generated on calcining is remarkably little as compared with the other pitch or tar, and the gas diffusion distance is remarkably short as compared with a large size block. When the time required for programming temperature up to 1,000° C. is set up optionally from 1 hour to 10 hours, no problems such as blistering or cracking were caused.

Accordingly, a continuous calcining of bulk articles in a tunnel type calcining oven can also be easily designed.

Figure 2:
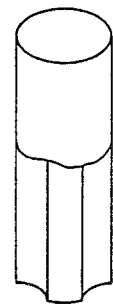
FIG. 2 is a perspective view of a cylinder which has been broken by half circles produced with use of the granulated powder.

With use of the aforementioned properties, carbon rods for dry cells can also be bulk-produced while being provided with a variety of shapes. That is, only round rods have conventionally been put to practical use. On the other hand, as the applications of dry cells have been enlarged, the dry cells which can deal with a large capacity load are required and the development of the elements constituting a composition with a high efficiency has been tried. If a carbon rod having a contact area with the composition larger than the conventional articles, a low composition contact resistance and a low electrode rod internal resistance can be bulk-produced, the added value of a manganese dry cell can be increased. From this aspect, the granulated powder of the present invention has a property by which the object can be achieved. The object can be achieved by molding a complex powder of a scaly graphite and a mesophase containing pitch into a shape as illustrated in FIG. 2 of a cylinder which has been broken by half circles along the longitudinal direction over a certain length. The object can be also achieved by applying a complex powder of a high conductive carbon black (e.g. KETCHEN EC) to a molded product as illustrated in FIG. 2. The former can exhibit a specific resistance (1 mΩcm) as large as of graphite by calcining at 1,000° C., and the latter, having been calcined up to a temperature of 1,700° to 2,000° C., can afford a molded product having a specific resistance as large as of graphite and a bending strength exceeding 500 kg/cm².

What is claimed is:

1. In a process for granulating a carbonaceous pulverulent body by spray-drying a slurry in heated air which can contain superheated steam, which slurry has a carbonaceous pulverulent body comprising a self-sintering carbonaceous pulverulent body dispersed in water in the presence of at least a binding agent and a wetting agent, the improvement which comprises:
   (1) employing, as said binding agent, a water-soluble organic compound which does not produce a foamed structure when carbonized at 1000° C. under an inert atmosphere and which provides a residual carbon yield of 10% by weight or more when carbonized at 1000° C. under an inert atmosphere, and the amount of said agent ranging in proportion from 0.01 to 5 parts by weight to 100 parts by weight of the carbonaceous pulverulent body; and
   (2) employing, as said wetting agent, a non-ionic surfactant having a clouding point of at least 25° C., and the amount of said agent ranging in proportion from 0.01 to 3 parts by weight to 100 parts by weight of the carbonaceous pulverulent body, thereby producing a granulated carbonaceous pulverulent body in the form of spherical particles which, upon contact with water, form a slurry which can be spray-dried.

2. The process for granulating a carbonaceous pulverulent body according to claim 1, wherein said self-sintering carbonaceous pulverulent body is at least a pitch pulverulent body selected from the group consisting of a coal-tar pitch, a petroleum pitch, a naphtha-degraded tar pitch, a mesophase-containing or heat-treated pitch and other various modified pitches and/or at least a complex pulverulent body selected from the group consisting of graphite-rich carbons, carbon-rich carbons, metals and inorganic compounds of which surface has been substantially coated with at least one of the pitches selected from said pitch group, and will give a calcined product by subjecting its room temperature press molding product to an ordinary pressure carbonization treatment at a temperature up to 500° C. in an inert atmosphere.

3. The process of claim 1, wherein said carbonaceous pulverulent body comprises a self-sintering carbonaceous pulverulent body in combination with at least one pulverulent body selected from the group consisting of mesophase-containing pitch, heat-treated pitch, graphite-rich carbons, carbon-rich carbons, metals and inorganic compounds.

4. The process for producing a self-sintering carbonaceous pulverulent body referred to in claim 2, wherein the surface of at least one element selected from the group consisting of a graphite-rich carbon, a carbon-rich carbon, a metal and an inorganic compound is coated with at least one pitch selected from a mesophase-containing pitch and a heat-treated pitch, which process comprises:
   (1) preparing a slurry by suspending at least one element selected from the group consisting of a graphite-rich carbon, a carbon-rich carbon, an inorganic compound, a metal and a metal compound in a tar fraction which contains a mesophase containing pitch or thermally treated pitch precursor;
   (2) separating a mixture comprising the element and a polynuclear aromatic polymer which contains the mesophase-containing or heat-treated precursor by adding to the slurry at least one solvent selected from the group consisting of (i) an aliphatic or alicyclic hydrocarbon having 5-20 carbon atoms and (ii) an aliphatic or alicyclic ketone compound having 3-5 carbon atoms in a mixing solvent ratio ($S_M$) of 2-15 (solvent weight/raw material tar weight), treating the mixture at a temperature of 0° to 60° C. to deposit a polynuclear aromatic polymer which contains the mesophase-containing or heat-treated pitch precursor on the surface of the element, separating the solvent-soluble fraction in the tar fractions together with the solvent from a solid component, subjecting the resulting cake and/or slurry to at least one washing treatment with a solvent selected from the groups consisting of (i) and (ii) referred to above in a rinsing solvent ration ($S_R$) of 1-15 (solvent weight/weight of raw material tar fraction) at a temperature of 0° to 60° C., and separating the solvent and the solvent soluble fraction from the obtained mixture; and (3) heat treating the mixture under an inert gas atmosphere at a temperature of 300° to 520° C. to convert the polynuclear aromatic polymer deposited on the element to a mesophase-containing or heat-treated pitch.

5. The process for granulating a carbonaceous pulverulent body according to claim 1, wherein the binding agent is selected from the group consisting of methyl cellulose and hydroxy cellulose and the wetting agent is a member selected from the group consisting of alkylphenol-ethylene oxide adducts, alkylphenolethylene oxide/propylene oxide adducts, oxyethylenepropylene block copolymers of a mean molecular weight of 2,000-8,000, alcohol ethoxylates, polyhydric alcohol esters and polyethylene glycol esters.

* * * * *